Oct. 13, 1931.  H. G. TRAVER  1,827,303
AMUSEMENT RIDE
Filed Jan. 8, 1926  6 Sheets-Sheet 1

Oct. 13, 1931.  H. G. TRAVER  1,827,303
AMUSEMENT RIDE
Filed Jan. 8, 1926  6 Sheets-Sheet 5

INVENTOR
Harry G. Traver
BY
ATTORNEY

Oct. 13, 1931.                H. G. TRAVER                1,827,303
                              AMUSEMENT RIDE
                          Filed Jan. 8, 1926          6 Sheets-Sheet 6

INVENTOR
Harry G. Traver
BY
ATTORNEY

Patented Oct. 13, 1931

1,827,303

UNITED STATES PATENT OFFICE

HARRY G. TRAVER, OF BEAVER FALLS, PENNSYLVANIA

AMUSEMENT RIDE

Application filed January 8, 1926. Serial No. 80,098.

This invention relates to amusement rides of the merry-go-round type wherein passenger carriers are propelled in a circular path, and it is the primary object of the invention to provide an improved ride of this character which is novel and adapted to impart a thrill to the passengers and attract the public.

A novel feature of the present ride resides in the arranging of the passenger carrier to simulate a tumble bug with means to support and propel the carrier about the track and so arranging the carrier relative to its support and propelling means to impart a to and fro sidewise swinging effect to the carrier about an axis extending longitudinally therethrough, simultaneously with the forward propelling movement thereof and thereby simulate the movement of a tumble bug.

A further object of the invention relates to improved means for supporting the carriers and propelling the same around a track, comprising arms extending radially from a support arranged centrally of the track, said arms being mounted upon the support to have revoluble movement about the same and independent vertical movement and for supporting the arm at the outer ends upon the track, and to improved means for flexibly carrying the carriers by the arms to compensate for any variations in the position of one arm relative to another arm.

Another object relates to the novel construction and arrangement of passenger carrier to simulate a tumble bug.

A still further object of the invention relates to an improved track structure for amusement rides.

Another object of the invention relates to improved means for bringing the ride to a stop at a predetermined point, such as the loading and unloading station, at will.

In the drawings accompanying and forming a part of this specification I have shown an embodiment of the invention wherein.

Figure 11:
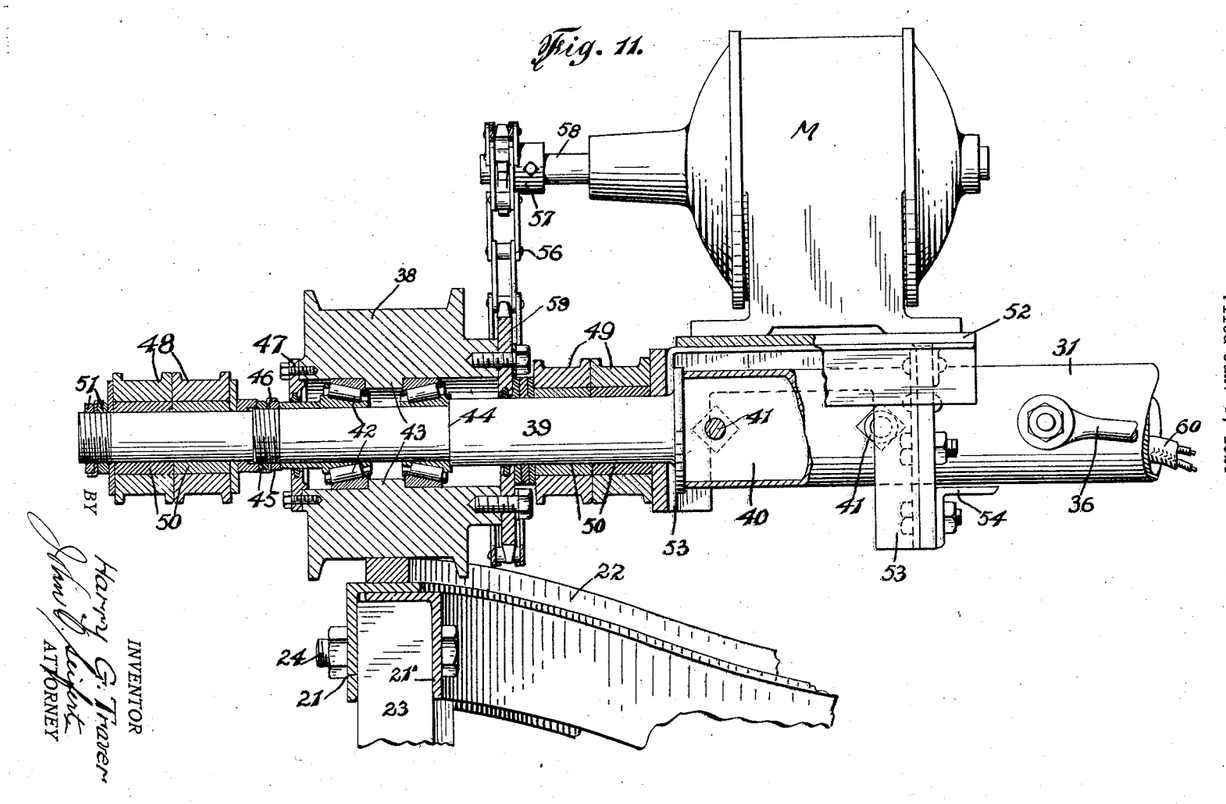
Figure 11 is a longitudinal sectional view, on an enlarged scale, to show the manner of mounting a traction wheel for engagement upon the track at the ends of the arms for the passenger carriers and the mounting of the means for the passenger carrier supports, together with the motive means for imparting revolving movement to the wheels to propel the arms with the passenger carriers around the track, and showing the same in relation to a portion of the track.
Figures 14, 15:
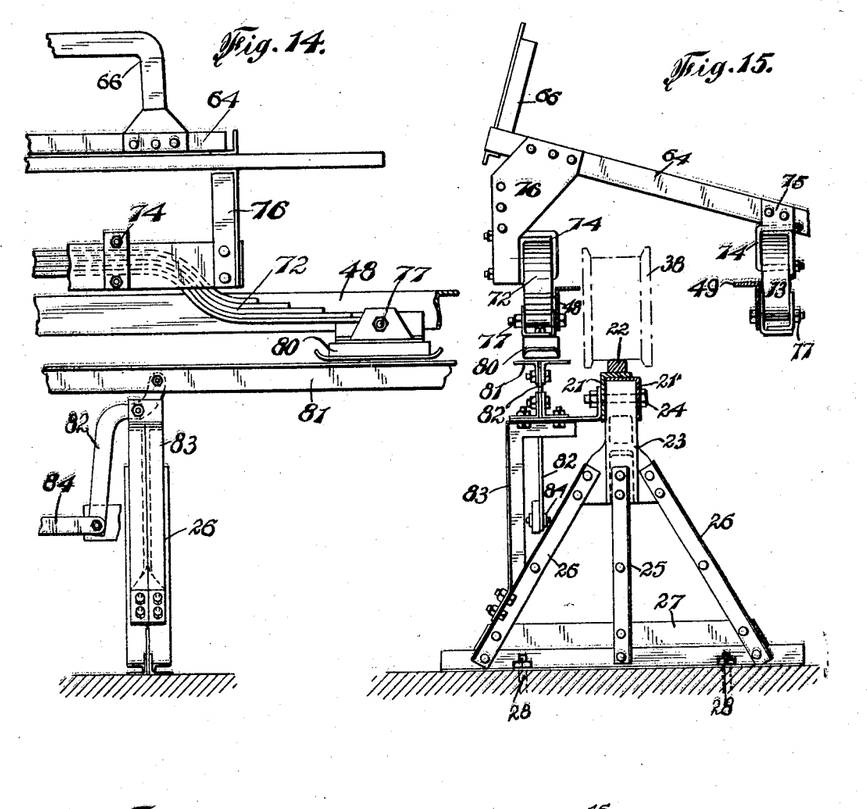
Figure 14 is a side elevation to show the braking means shown in Figures 12 and 13 in relation to a brake shoe carried by the passenger carrier mounting.
Figure 15 is an end elevation looking at the right of Figure 14.
Figure 16:
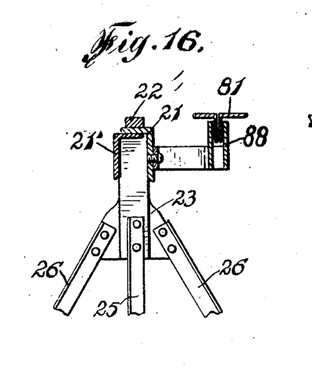
Figure 16 is a cross sectional view taken on the line 16—16 of Figure 17 looking in the direction of the arrows to show the construction and arrangement of my improved track and showing braking means in relation thereto.
Figure 17:
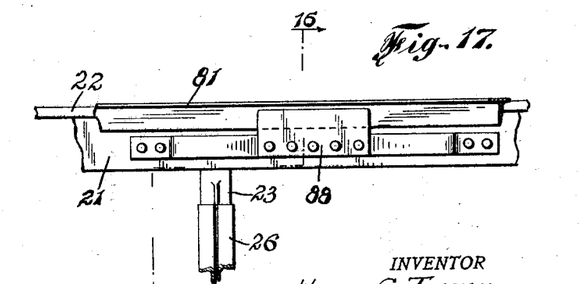
Figure 17 is a side elevation of a portion of the track and showing the braking means mounted in relation thereto.

In the embodiment of the invention illustrated in the drawings a circular track 18 comprising a single rail is arranged with rises and dips or undulations in a vertical direction, as shown at 19 and 20. The rail is of channel shape in cross section and to provide a reinforced rail it is built up of two pieces of angle iron 21, 21' (Figures 11 and 15 to 16) with an angle portion of one bar in juxtaposed relation to an angle portion of the other bar. A flat bar 22, preferably of rectangular shape in cross section and to constitute the traction surface of the rail, is secured to the outside of the connecting portion of the rail as by rivets or bolts having the heads countersunk into the bar and passing through the overlapped portions of the angle bars. The rail is mounted upon supports comprising a head 23 having a part to engage within the channel portion of the rail and the latter secured thereto by bolts, as shown at 24. The heads are mounted upon vertical struts 25 connected to the heads to be directly in line and below the rail, and struts 26 fixed to and diverging outward, the struts 25, 26 being preferably of angle iron and secured together by cross bars 27 and whereby the struts are mounted upon a suitable base, such as concrete, and anchored thereto by tie rods imbedded in the base extending through perforations in the lowermost connecting bar 27 and nuts threaded onto the ends thereof, as shown at 28 in Figure 15. The heads 23 at the curved portion of the rail at the juncture of the dips and rises is of curved formation to conform to the curvature of the rail and thereby facilitating the arranging of the curved portions of the track.

Figure 1:
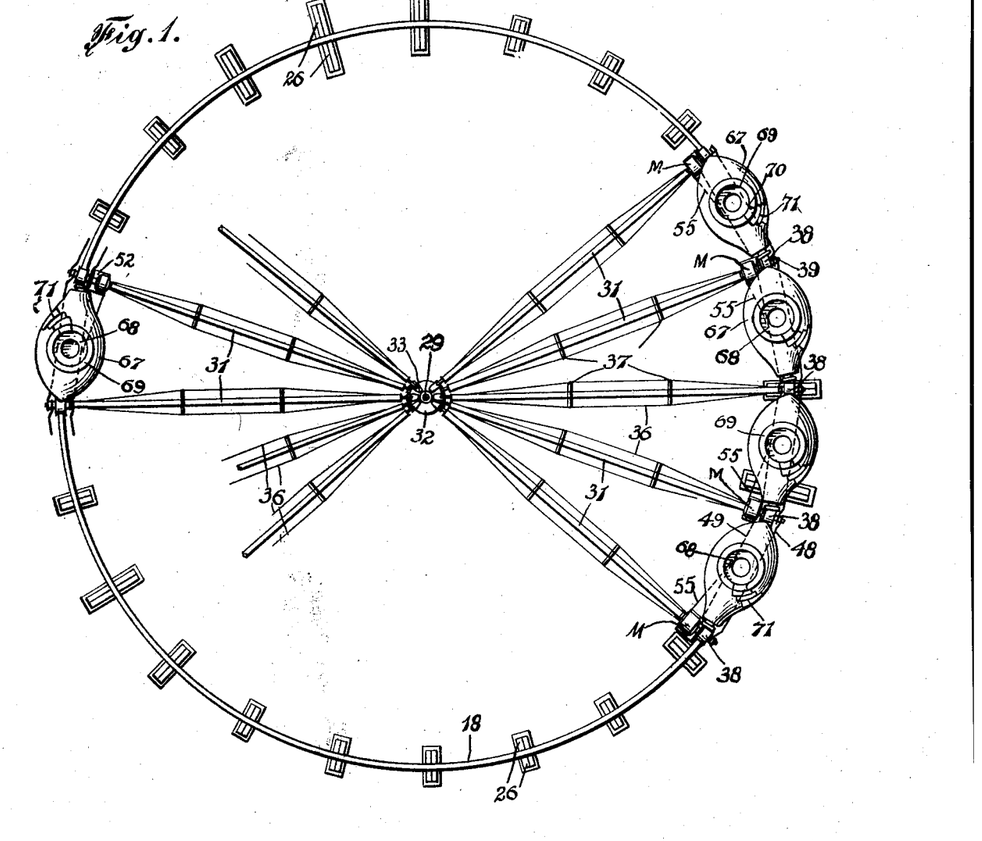
Figure 1 is a plan view of an amusement ride, partly broken away, and illustrating an embodiment of my invention.
Figure 2:
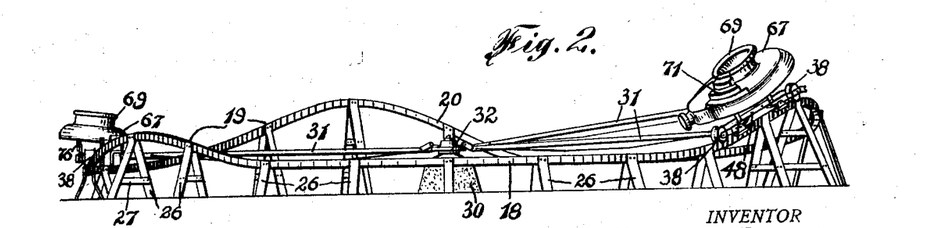
Figure 2 is a side elevation.

A fixed vertical support 29 to which the track is concentrically arranged is mounted on a base of concrete 30. Arms or sweeps 31, in the present instance of tubular form, are supported at one end by the support 29 to extend radially therefrom with the outer ends supported upon the tracks. These arms are in the nature of carriers for passenger carriers or cars arranged in a group or series of groups circumferentially disposed around the support 29 whereby the ride is adapted to consist of a single train or a series of trains of passenger carriers. In the present instance as shown in Figure 1 there are two trains of said carriers. Of course, it will be obvious that there may be a single train extending the full circumference of the track by disposing the arms or sweeps around the entire area of the track. Preferably there is only one or two oppositely disposed trains for facilitating loading and unloading of the passenger carriers. The inner ends of the sweeps are mounted upon the support 29 through a disk portion on a head 32 by bifurcated brackets 33 with the bifurcated portion extending beyond the periphery of the disk, with alternate brackets fixed to opposite surfaces of the head disk, as clearly shown in Figure 6. A part 34 engaged and fixed in the inner ends of the sweeps is engaged within the bifurcation of the brackets and pivotally connected thereto to have movement on horizontal axes by pins engaged in perforations in the legs of the bracket bifurcation and said interposed part, as at 35. By this arrangement the sweeps are adapted to have revolving movement about the fixed support 29 in a horizontal plane and also independent up and down movement in a vertical direction as the outer ends of the sweeps ride up and down the rises and dips in the track. The sweep arms are reinforced by tie rods 36 connected at opposite ends to adjacent opposite ends of the sweeps with the intermediate portions of the tie rods deflecting downward and laterally of the sweeps and maintained in such position by braces 37 on the sweeps. The outer ends of the arms are supported upon the track by traction means comprising double flanged wheels 38, that is the wheels have a flange at opposite sides to engage at opposite sides of the rail, the traction surface of the wheels being of greater width than the track bar 22 to permit of movement of the wheels laterally of the rail and compensate for variations in the position of the wheel as the sweep arms are moved in a vertical direction relative to the dips and rises in the track.

To mount the traction wheels upon the sweeps are provided with an extended portion 39 which is in the nature of an axle, said axle having a reduced end 40 to engage in the end of the sweep and secured therein by bolts 41. The traction wheel is mounted on said axle by means of anti-friction bearings, shown as a pair of roller bearings 42 arranged in abutting relation to shoulders formed by an annular rib 43 in the bore of the wheel and the inner bearing abutting a shoulder formed by a reduced portion of the axle, as at 44. The outer bearing is maintained in abutting relation to the rib 43 by nuts 45 threaded onto the axle at the end of a sleeve portion of said bearing, the nuts being locked to the shaft by bending nibs of a washer interposed between the nuts against the sides of the nuts, as at 46. A dust cap 47 for the wheel bearing is arranged at the outer side of the wheel.

Adjacent sweeps or arms are flexibly connected by a pair of parallel and spaced apart links 48, 49 pivotally mounted on the arm axles 39 at opposite sides of the traction wheels preferably with interposed bushings 50, so that the links 49 are interposed between the ends of the sweeps and the traction wheels while the links 48 are connected at the outer ends of the axles and retained thereon by a pair of nuts 51 locked thereto by a locking washer in a manner similar to the nuts 45.

The motive means to propel the arms around the track comprises electric motors M fixed to supporting brackets 52 (Figure 11) having a platform portion upon which the motor is mounted at the top of the arms and downwardly extending bifurcated portions 53 at opposite ends the legs of which engage at opposite sides of the arms and the outer bifurcated portion at the shoulder formed by the reduced portion of the axle extending beyond the arm whereby the bracket with the motor may have a rotative or rocking movement on the shaft. The bracket is maintained on the shaft by a member 54 fixed at opposite ends to the bifurcation legs to extend transversely of the space between the legs and below the shaft. To maintain the bracket against movement on the shaft but to permit of slight rocking movement as the outer ends of the sweeps move up and down as they ride up and down the rises and dips in the track, an arm 55 (Figure 3) is connected at one end to the motor supporting bracket and has a pivotal connection at the opposite end with the inner link 49 intermediate the ends thereof. By this arranging of the motor mounting upon the sweep the torsional stresses and strains of the motor in the transmitting of the power thereof to a traction wheel is taken up in a sweep connecting link by the arm 15 and transmitted to the sweep as a straight line force and not as a twisting force to be taken up or resisted by the pivot supports of the sweep.

The motors are operatively connected to the traction wheels to propel the interconnected sweeps or arms by a sprocket chain 56 (Figure 11) passing around a sprocket wheel 57 on the shaft 58 of the motor and sprocket wheel 59 fixed to one end of the traction wheel in interposed relation to said traction wheel and the arm connecting links 49, said sprocket wheel also being arranged to serve as a dust cap for the inner end of the wheel bearing.

The motor is connected to a source of electric energy by conductors carried in a cable, as at 60, extending through the arms 31 with one terminal of each conductor connected to the brushes of the motor as usual, the opposite end of the conductor carrying cable passing through an opening in the wall of the arm and each conductor connected to a brush carried on and insulated from the head 32, as at 61, to have rubbing contact with annular contact bearings 62 mounted on and insulated from the central support 29 above the head 32, and connected to the source of electric energy by conductors carried in a cable 63 extending through the base support and the support.

Figures 7, 8, 9, 10:
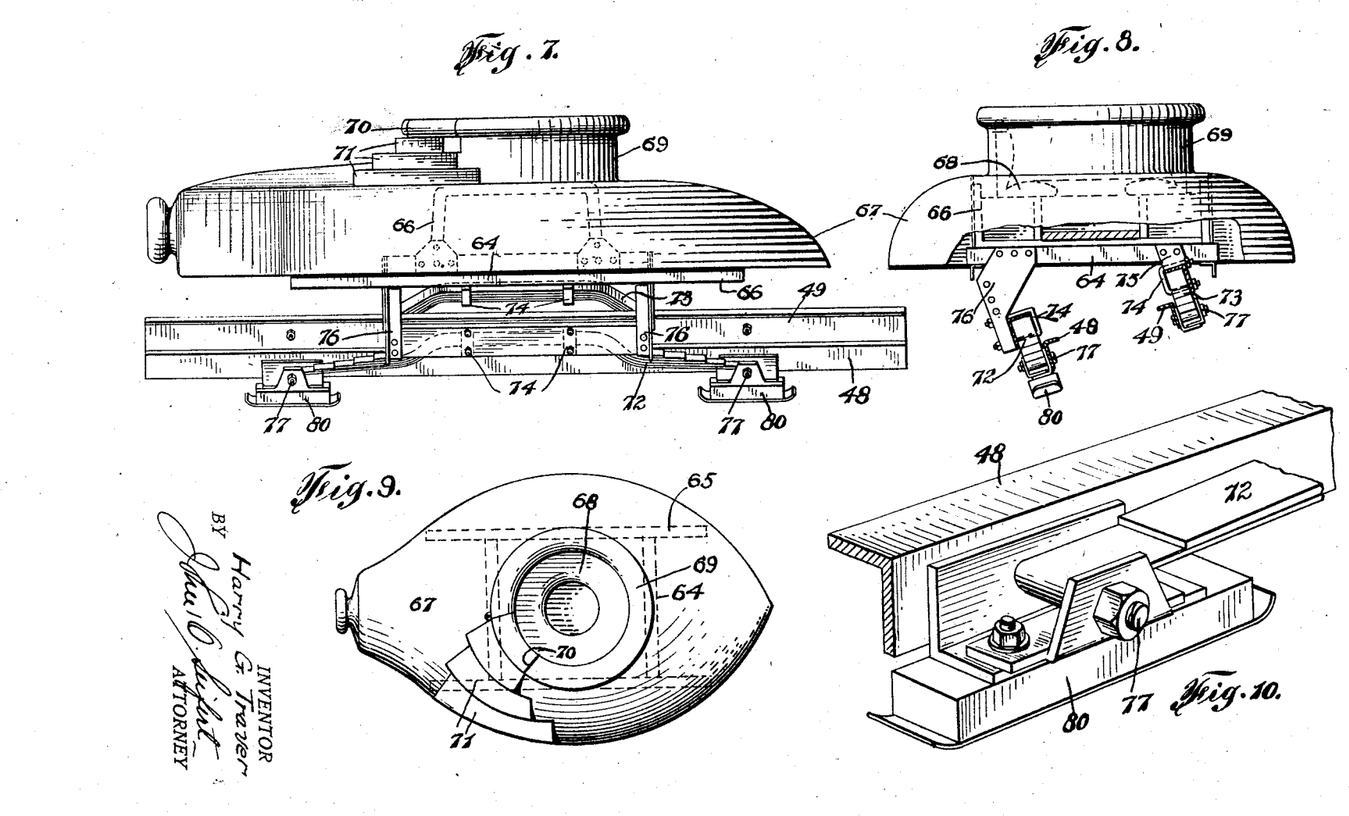
Figure 7 is a side elevation of the passenger carrier and showing the means for mounting the same upon the propelling and carrying arms therefor.
Figure 8 is an end elevation, partly broken away, of the passenger carrier looking at the right of Figure 7.
Figure 9 is a plan view of the passenger carrier.
Figure 10 is a perspective view, on an enlarged scale, of a detail showing a brake shoe connected to the passenger carrier mounting.

The passenger carriers or cars, shown in Figures 7, 8 and 9, are constructed and arranged to simulate a "tumble bug". For this purpose there is provided a rectangular frame 64 having the ends of the opposite side members extended beyond the connecting cross bars, as shown at 65 in Figure 9, with arched members 66 secured to the cross bars of the frame. Around this frame there is constructed an enclosing sheathing 67 of sheet metal or the like, with a circular opening arranged centrally in the top having a seat for the passengers therein, as shown at 68. A back rest 69 for the seat is arranged about the opening in the form of a parapet extending upward from the sheathing and about the opening. To facilitate the entrance and exit of passengers to and from the car there is an opening 70 in the side of the back rest with steps 71 on the top of the sheathing leading to said opening.

Figures 3, 4, 5, 6:
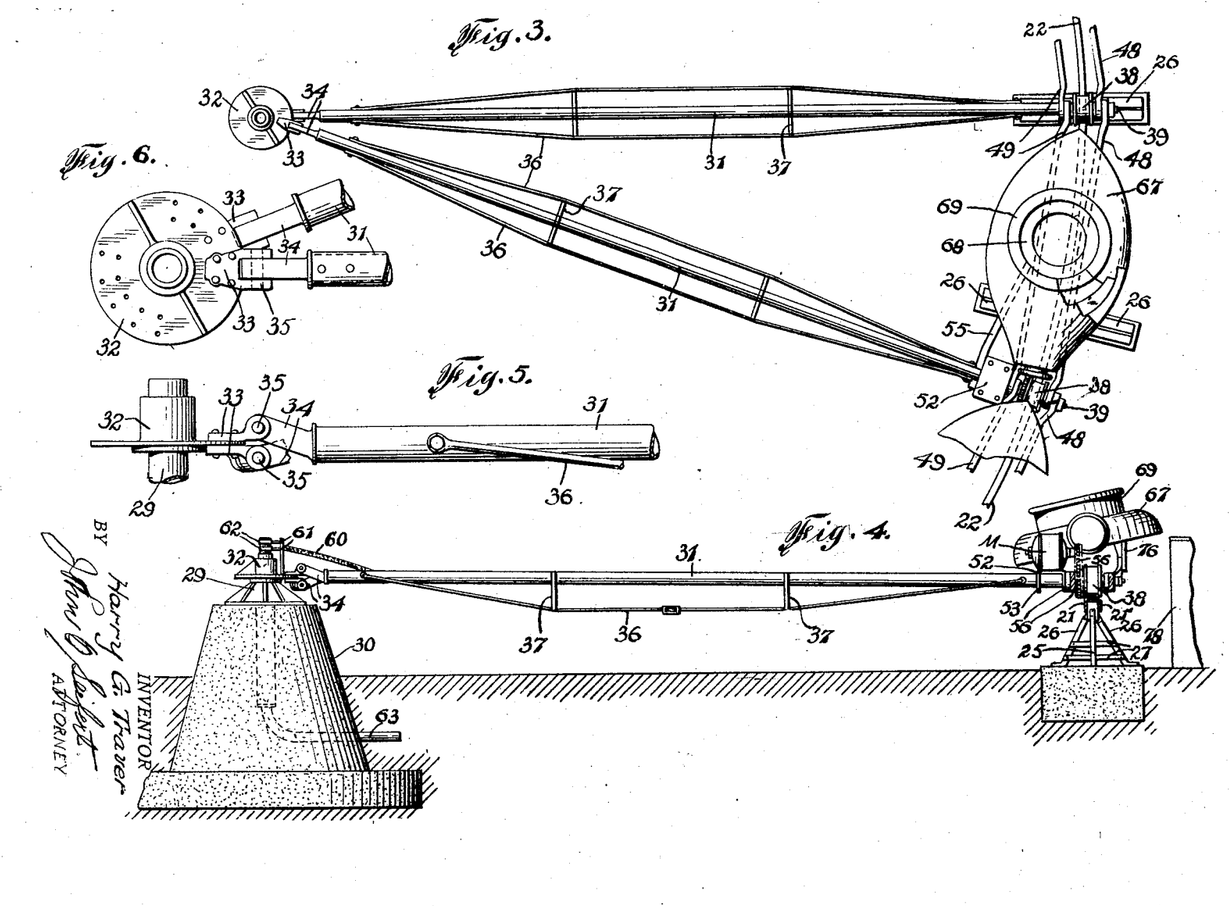
Figure 3 is a plan view of a portion of the ride to show the mounting of the passenger carriers upon propelling and guiding arms therefor.
Figure 4 is a side elevation of the parts shown in Figure 3.
Figure 5 is a side elevation of the means for mounting the car carrying arms upon the central support to have movement about the same and independent movement in a vertical direction.
Figure 6 is a plan view of the parts shown in Figure 5.

The passenger carriers are carried by the arms or sweeps 31 to be propelled by said arms around the track. For this purpose the passenger carriers are resiliently mounted upon the arm connecting links 48, 49 in interposed relation to a pair of arms 31. The carriers are mounted upon the links through the intermediary of laminated leaf springs 72, 73 to extend parallel with the arm connecting links, the spring 73 being connected intermediate the ends by U bolts or clips 74 with brackets 75 fixed to and extending upward from the cross bars of the carrier frame 64. The other spring 72 is connected similarly to the spring 73 to brackets 76 also fixed to and extending downward from the cross bars of the carrier frame, but said brackets being of somewhat greater length than the brackets 75 for a purpose to be hereinafter described. The free ends of the springs are connected to bolts fixed in and extending laterally from the arm connecting links 48, 49, as at 77. The arm connecting links 48, 49 instead of being flat as shown in Figure 3 may be made of angle iron as shown in Figures 7, 8, 10, 14 and 15. By making the brackets 76 longer than the brackets 75 the carrier will be tilted in a direction inward toward the arms 31 tending to give the carriers a banking effect especially when at the top of the rises in the track. Furthermore, it tends to throw the weight of the carriers in a direction toward the arms the force of which is taken up by the arms as a stress extending longitudinally through the arms. The throwing of the weight of the carriers upon the arms in this manner also overcomes any centrifugal force which may be imposed on the carriers during the revolving movement thereof about the central support 29 as they are propelled about the track. Also by this arrangement due to the movement of the car carrying arms 31 moving in a vertical direction as the traction wheels ride up and down the rises and dips in the track, it will give an effect to the car as though it was being swung from side to side or rocked on an axis extending longitudinally through the car and in the direction of travel of the car and thus simulating the movement of a tumble bug, thus adding greatly to the novelty of the ride and thrilling not only the passengers but also the spectators.

Figure 12:
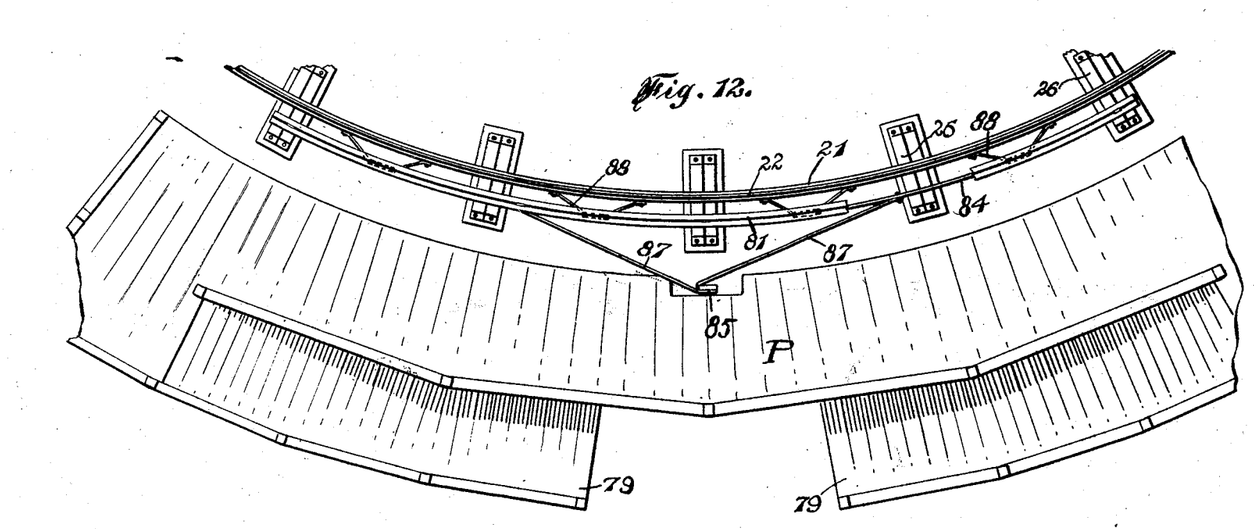
Figure 12 is a plan view of a portion of the track showing the same in relation to a loading and unloading platform and braking means in relation to the track operative to bring the ride to a stop with the passenger carriers at said platform.
Figure 13:
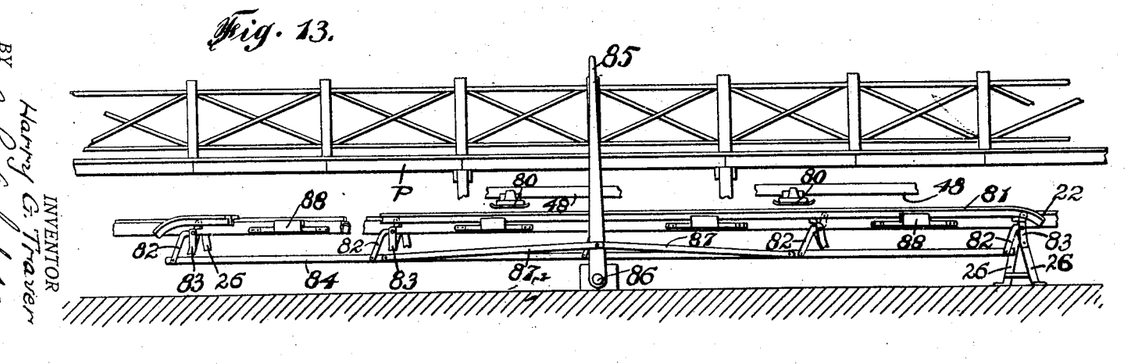
Figure 13 is a side elevation of the parts shown in Figure 12 looking at the bottom thereof.

At the lowermost and horizontal portion of the track a loading and unloading station or stations is arranged, comprising a platform P (Figures 12 and 13) at the outer side of the track and access to which platform is by suitable means, shown in the present instance as ramps 79. Should there be only one train of passenger carrying only one of said platforms is provided but when the ride includes two trains as shown in Figure 1 two platforms are preferably provided to facilitate the quick loading and unloading of the ride.

To bring the ride to a stop at will at the platform P brake mechanism is provided comprising shoes 80 pivotally mounted on the bolt 77 for connecting the car supporting springs to the outer arm connecting links 48. A brake beam 81 is carried by the track supporting structure in the line of travel and to be engaged by the brake shoes. This beam is pivotally connected to one end of levers 82 pivotally mounted on angle brackets 83 mounted on the members 26 of the track supporting structure, and also connected to the rail structure by the bolts 24. The levers are interconnected by a rod 84 and actuated through the movement of said rod to throw the brake rail into and out of operative relation to the brake shoes by a manually operated lever 85 pivotally supported at one end, as at 86, and connected to the lever connecting rod 84 by links 87. To guide the brake beam it is slidably mounted in guide members 88 fixed to the side of the traction rail.

It will be obvious that various changes and modifications may be made in construction and arrangement of parts, and that portions of the invention may be used without others, without departing from the scope of the invention.

Having thus described my invention I claim:

1. In amusement rides, a central vertical support, a head rotatably carried by the support, arms pivotally mounted at one end on the head to rotate with the head and the free ends to have movement in a vertical direction, a track concentric with the support having dips and rises arranged therein, wheels rotatably mounted concentrically at the outer ends of the arms and tractionally supporting the arms on the track, links connected to the outer ends of the arms at the opposite sides of the wheels to maintain the arms in spaced relation, passenger carrying cars flexibly mounted on the links, and motive means carried on the arms to rotate the wheels and thereby revolve the arms with the cars around the track.

2. In amusement rides, a central vertical support, a track rail arranged concentrically of the support having vertical undulations, radial arms mounted at one end on the support to have movement around the same and the outer ends to have movement in a vertical direction, traction wheels at the outer ends of and supporting the arms on the track rail, means for flexibly connecting the arms at the outer ends, cars, means for mounting the cars on the arm connecting means with the outer side of the car arranged at a higher plane than the inner side to effect a banking of the cars and also a sidewise swaying movement when moved around the track with the arms, and means for propelling the arms with the cars around the track.

3. In amusement rides, a central support, a track rail concentric with the support arranged with vertical undulations, a head rotatably mounted on the support, arms mounted at one end on the head to have movement with the head around the support, a wheel rotatably carried at the outer end of each arm for tractionally supporting the arms on the track rail, said wheels having flanges at the opposite ends to engage at opposite sides of the track rail, links connecting the arms pivotally mounted at opposite ends on adjacent arms and arranged at opposite sides of the wheels, cars mounted on the links, and motive means mounted on an arm and having an operative connection with the supporting wheel for said arm to propel the arms with the cars around the track.

4. In amusement rides, a central support, a track concentric with the support and arranged with vertical undulations, a head rotatably mounted on the support, tubular arms pivotally supported at one end by the head to have vertical movement, reinforcing truss rods for said arms, an axle carried at the outer end of each arm, a double flanged wheel rotatably mounted on the axle and having contact with the track, links connecting the arms pivotally mounted on the axle at both sides of the wheels, cars mounted on the links, an electric motor rotatably mounted on the arms, sprocket wheels rotatable with the motor shaft and wheels, and a chain passing around the sprocket wheels to operatively connect the motor with a wheel to propel the arms with the cars around the track.

5. In amusement rides, a central support, a track arranged concentrically of the support, arms mounted on the support to extend radially therefrom and for movement about the support and in a vertical direction, traction means mounted on the outer ends of the arms connecting to support the arms on the tracks, cars, means for flexibly connecting the arms at the ends and carry the cars, motive means for propelling the arms with the cars around the track, brake shoes carried by the arm and car carrying means, and a rail pivotally supported in the path of movement and to be engaged by the track shoes for stopping the movement of the arms with the cars in predetermined position.

6. In amusement rides, a central fixed support, a head rotatably mounted on the support, a track arranged concentrically of the support and having dips and rises therein, arms extending radially from the support and pivotally supported by the head to have movement with the head about the support and on the head in a vertical direction, wheels rotatably mounted on the opposite ends of the arms to support and carry the said arms on the track, a pair of parallelly extending links engaged upon the arms at opposite sides of the wheels for connecting adjacent arms, cars, a leaf spring extending parallel of and connected at opposite ends with each link and upon which spring the cars are mounted, and electric motors mounted on the arms and having driving connection with the wheels for propelling the arms upon the track.

7. In an amusement ride, a fixed support, a track arranged concentrically of the support, arms mounted at one end on the support to extend radially therefrom and have movement in a circular path about said support and independent movement on horizontal axes, traction wheels rotatably carried at the end of said arms to engage and support said end of the arms upon the track, cars, a pair of links pivotally engaged at opposite ends upon adjacent arms with one link arranged at one side of the traction wheels and the other link at the opposite side of the traction wheels to connect the arms and flexibly support and impose the weight of the cars upon the traction wheels, and electric motors mounted on said arms having a driving connection with the traction wheels to propel the arms with the cars around the track.

8. An amusement ride as claimed in claim 7, wherein the arms are of tubular structure and the driving means comprises an electric motor electrically connected to a source of electricity by conductors extending through the arms in electrical connection with the motor and contact terminals to have rubbing contact with contact terminals carried by the fixed support electrically connected to conductors extending up through the support and connected with the source of current supply.

9. An amusement ride as claimed in claim 7, wherein the mounting of the car carrying arms upon the fixed support comprises a head loose on the support having a disk portion, brackets fixed on and circumferentially disposed around said disk with a perforated bifurcated portion of the bracket extending beyond the periphery of the disk, and the arms having a perforated part to engage in the bifurcation of the brackets and pivotally supported therein by a pin engaged in the perforations in said part and the bracket bifurcation.

10. In an amusement ride, a fixed support, a track rail concentric with the support and arranged with dips and rises, arms extending radially from the support and mounted thereon to have movement about the support and independent movement in a vertical direction and having a traction support at the outer ends upon the track rail, passenger carrying cars, means to connect the arms at the outer ends and support the cars by the wheels upon the track with the track extending substantially in the plane of the longitudinal axis of the cars and direction of travel of the cars, said means being arranged to tilt the cars inwardly whereby as the cars travel about the track with the arms a sidewise swaying effect will be imparted to the cars by the arms as the arms with the cars ride up and down the rises and dips of the track rail, and means to propel the arms around the track.

Signed at Beaver Falls, in the county of Beaver and State of Pennsylvania, this 30th day of October, 1925.

HARRY G. TRAVER.